United States Patent Office 3,549,679
Patented Dec. 22, 1970

3,549,679
MYRCENE DERIVATIVES AND PROCESS THEREFOR
Heinrich Kappeler, Wurenlos, and Jost Wild, Zurich, Switzerland, assignors to Givaudan Corporation, Clifton, N.J., a corporation of New Jersey
No Drawing. Filed Oct. 15, 1968, Ser. No. 767,842
Claims priority, application Switzerland, Oct. 31, 1967, 15,286/67
Int. Cl. C07f *15/02;* C07c *69/00, 69/52*
U.S. Cl. 260—439        13 Claims

ABSTRACT OF THE DISCLOSURE

Compounds of the general formula:

$$R-CH_2-CH_2-C(=CH_2)-CH=CH_2.Fe(CO)_3 \quad (I)$$

where R is a group of one of the Formulae a–e.

| | | |
|---|---|---|
| $-CHR_1-C(=CH_2)CH_3$ | (a) |
| $-CR_1=C(CH_3)_2$ | (b) |
| $-CH_2-C(OR_2)(CH_3)_2$ | (c) |
| $-CHOH-CH(CH_3)_2$ | (d) |
| $-CHOH-C(OH)(CH_3)_2$ | (e) | wherein $R_1$ signifies acetyl or acetoxymethyl and $R_2$ signifies hydrogen, low alkyl (preferably containing 1–6 C-atoms such as, especially, methyl or ethyl) or lower alkanoyl (preferably containing 1–6 C-atoms such as, for example, formyl, acetyl, propionyl, butyryl). These compounds are sources for known odorants useful in perfumery.

BACKGROUND OF THE INVENTION

Although myrcene has found extensive use as a raw material for products intended for use in perfumery and other fields, one of its drawbacks to wider use is the marked reactivity, including tendency to polymerize, of its conjugated double bonds.

The present process permits protecting the system of conjugated bonds, while, at the same time retaining the reactivity of the isolated double bond. Accordingly, in the form of the iron tricarbonyl complex II, myrcene can be subjected to reactions at the isolated double bond in a selective manner.

SUMMARY OF THE INVENTION

It is an object of this invention to provide a commercially feasible process to prepare compounds of Formula I.

It is another object of this invention to subject myrcene to reactions at its isolated double bond in a selective manner.

A still further object of this invention is to make possible the conversion of myrcene into addition or substitution products which cannot be obtained or can only be obtained in substantially less pure form by direct addition or substitution reactions.

The process in accordance with the invention for the manufacture of the compounds of general Formula I is characterized in that:

(1) Myrcene is reacted with iron pentacarbonyl,
(2) The novel myrcene-(iron tricarbonyl) complex of the formula:

$$(CH_3)_2C=CH-CH_2-CH_2-C(=CH_2)$$
$$-CH=CH_2.Fe(CO)_3 \quad (II)$$

which is obtained is converted into a novel complex of the general formula:

$$R-CH_2-CH_2-C(=CH_2)-CH=CH_2.Fe(CO)_3 \quad (III)$$

wherein R has the above significance, and (3) The complex of Formula III obtained is decomposed.

In addition to its utility in the process of this invention, compound II serves as a means for purifying crude, commercial myrcene.

DESCRIPTION OF THE PREFERRED EMBODIMENTS

In the first process step, myrcene is reacted with iron pentacarbonyl (a yellow liquid of boiling point 105° C. which is manufactured on a large scale). This reaction can be undertaken by heating a mixture of myrcene and iron pentacarbonyl in a high-boiling solvent such as, for example, in dibutyl ether under reflux for several hours. The process of the reaction may be followed by measurement of the carbon monoxide released. After completion of the reaction, the precipitated inorganic material is separated off by filtration. After removal of the solvent and of excess iron pentacarbonyl, the myrcene-(iron tricarbonyl) complex obtained can be isolated in pure form as a yellowish oil by vacuum distillation. The yield is practically quantitative. When using commercial myrcene which, as is known, contains a considerable percentage rate of impurities such as limonene, β-pinene and 1(7), 8-p-menthadiene, the yields are naturally correspondingly lower.

In the iron tricarbonyl complex thus obtained, the conjugated double bonds of the myrcene which exhibit a marked tendency to polymerization are protected. The iron tricarbonyl acts as a protecting group for the system of the conjugated double bonds. The reactivity of the isolated double bond is, however, retained. Accordingly, as aforesaid, in the form of this complex myrcene can be subjected to reactions at the isolated double bond in a selective manner.

As aforesaid, in addition to its utility as a raw material for the preparation of complexes III which in turn are useful in accordance with this invention in the preparation of known odorants I, the myrcene-(iron carbonyl) complex, II, has another unexpected utility. Its formation, in situ, from commercial myrcene, followed by subsequent distillation and decomposition of the myrcene complex permits a very effective purification of the myrcene. Thus, in particular, 1(7),8-para-menthadiene, a component of commercial myrcene does not lend itself, as is known, to be separated from myrcene by distillation. However, if commercial myrcene is complexed to form II, the aforesaid menthadiene can be distilled off prior to decomposition of II as the menthadiene does not form a complex.

The complex II obtained can be reacted with an acetylating or with an acetoxymethylating agent. Substitution products of Formula IIIa or IIIb (generally in the form of isomer mixtures) are thereby obtained.

$$CH_3-C(=CH_2)-CHR_1-CH_2-CH_2-C(=CH_2)$$
$$-CH=CH_2\cdot Fe(CO)_3 \quad (IIIa)$$

$$(CH_3)_2C=CR_1-CH_2-CH_2-C(=CH_2)$$
$$-CH=CH_2\cdot Fe(CO)_3 \quad (IIIb)$$

In Formulae IIIa and IIIb, $R_1$ signifies acetyl or acetoxymethyl.

Suitable as acetylating agents are, for example, acetyl chloride or acetic anhydride, the acetylation conveniently being performed in chloroform and in the presence of $AlCl_3$, $ZnCl_2$ or $SnCl_4$. The acetylation may be particularly well performed with acetyl chloride and $SnCl_4$ at 0–20° C. in chloroform. In this case, besides the acetylation product IIIa ($R_1=COCH_3$) there is also additionally formed the corresponding chlorine-containing compound, that is (7-chloro-7-methyl-6-acetyl-3-methylene-octene-1-)-(iron tricarbonyl) complex. This complex may be smoothly converted into the complexes IIIa and IIIb ($R_1=COCH_3$), for example with methanolic KOH.

As the acetoxymethylating agent, there can be used a substance which is capable of releasing formaldehyde (such as, for example, trioxymethylene) in the presence of an acidic catalyst (such as, for example, $H_2SO_4$) in glacial acetic. Advantageously, the formaldehyde precursor is heated to about 70–100° C. by warming with the acidic catalyst and the myrcene complex introduced into the cooled solution at room temperature.

By treatment of the myrcene-(iron tricarbonyl) complex II primarily obtained with a hydrating agent, with a lower alkanol or with a lower alkanecarboxylic acid in acidic medium, rearrangement products of the general formula

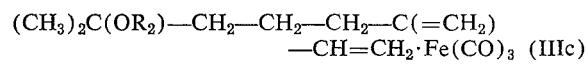

$$(CH_3)_2C(OR_2)-CH_2-CH_2-CH_2-C(=CH_2)$$
$$-CH=CH_2 \cdot Fe(CO)_3 \quad (IIIc)$$

wherein $R_2$ signifies hydrogen, lower alkyl or lower alkanoyl, can be obtained.

For the hydration, the myrcene-(iron tricarbonyl) complex II is advantageously kept at 20–50° in aqueous dioxan and in the presence of a strong acid such as 50–80% sulphuric acid or $BF_3$ for 24–72 hours.

The alcohol addition for the purpose of producing addition products of Formula IIIc with $R_2$=lower alkyl can be performed in the corresponding lower alkanol as solvent and in the presence of concentrated sulphuric acid or $BF_3$, advantageously for 48 hours at room temperature.

The addition of a lower alkanecarboxylic acid for the purpose of producing addition products of Formula IIIc with $R_2$=lower alkanoyl can be brought about by allowing the corresponding lower alkanecarboxylic acid (such as formic acid or acetic acid) to act on the myrcene-(iron tricarbonyl) complex II in the presence of $BF_3$-etherate at 20–50° C. for about 24– 48 hours.

Addition products of Formula IIId $$(CH_3)_2CH-CHOH-CH_2-CH_2-C(=CH_2)$$
$$-CH=CH_2 \cdot Fe(CO)_3 \quad (IIId)$$

are obtained when the myrcene-(iron tricarbonyl) complex II is subjected to hydroboration with $B_2H_6$ and the organoborane obtained as the reaction product is oxidatively cleaved.

The borane can be manufactured according to usual methods from boron trifluoride and sodium borohydride in diglyme and then brought to reaction with the myrcene-(iron tricarbonyl) complex II dissolved in, for example, tetrahydrofuran. Preferably, borane preparation and hydroboration are carried out in two separate reaction vessels. The oxidative cleavage of the organoborane can be undertaken with alkaline hydrogen peroxide, preferably in the cold.

The myrcene-(iron tricarbonyl) complex II may be converted into the diol of the formula

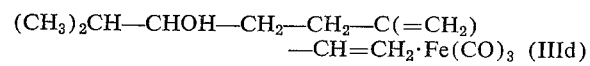

$$(CH_3)_2C(OH)-CHOH-CH_2-CH_2-C(=CH_2)$$
$$-CH=CH_2 \cdot Fe(CO)_3 \quad (IIIe)$$

by hydroxylation with $OsO_4$.

The hydroxylation can, for example, be undertaken in an inert solvent such as, for example, dimethylformamide, carbon tetrachloride or chloroform at 0–40° C., preferably at room temperature. The reaction is accelerated by the presence of a tertiary amine. The osmium tetroxide can either be used in equimolar amounts or, on the other hand, can be used in catalytic amounts together with an oxidising agent such as, for example, potassium chlorate.

By decomposition of the complexes of Formula III which are obtained, there are obtained the myrcene derivatives of general Formula I. These contain the original system of the two conjugated double bonds in unaltered form. A reaction has taken place solely in the region of the isolated double bond by addition or substitution re-

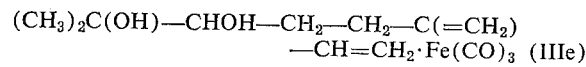

actions, possibly with partial displacement of the double bond in the terminal position.

The decomposition of the complexes III for the purpose of producing the myrcene derivatives I can be undertaken with oxidizing agents which are capable of 1-electron jumps, such as $Fe^{III}$ or $Ce^{IV}$ salts or $Pb(OAc)_4$. Particularly suitable are $Fe^{III}$ and $Ce^{IV}$ salts such as iron trichloride or cerium ammonium nitrate. Also particularly advantageous is decomposition using high CO pressure. This neat procedure at the same time allows a recovery of the iron pentacarbonyl.

The myrcene derivatives of general Formula I which are obtainable according to the process in accordance with the invention in an elegant manner in very pure form are known compounds with odorant properties.

As aforesaid, the known compounds I are known to be useful in perfumery as odorants. Those skilled in the art of perfumery will know how to use the compounds I, without the need of any directions here. Suffice it to say that the compounds I can be used in the same or similar manner as the well known linalool and linalyl acetate. For example, two of the compounds I, i.e., myrcenyl acetate (Example 2) and myrcenol (Example 3) are said "to possess pleasant odors, somewhat reminiscent of linalool and its acetate" in P. Bedoukian, "Perfumery and Flavoring Synthetics," 2nd edition, Elsevier Publishing Company, N.Y. (1967), page 374.

Linalool and its acetate may be used in amounts of 1 to 60%, by weight, preferentially 3 to 25%. The use may be found in the literature, e.g. in Jasmin compositions: R.M. Gottefosse, "Formulary of Perfumes and Cosmetics," 1st edition, page 16, Chemical Publishing Co., Inc., N.Y. 1959. The use in a honeysuckle formulation is given in W. A. Poucher, "Perfumes, Cosmetics and Soaps," vol. 2, 7th edition, page 132, D. Van Nostrand Co., Inc., Princeton, N.J., 1959. Linalool is very widely used in soap, detergents, etc., and in all kinds of floral and non-floral type compositions, in particular bergamot, lavender, petitgrain and citrus; (see P. Bedoukian, loc. cit., page 233).

In the following illustrated examples, the temperatures are stated in degrees centigrade and the percents and parts are by weight, unless otherwise specified.

EXAMPLE 1

95 g. of crude myrcene (content ca. 85%; impurity chiefly pseudolimonene) and 203 g. of iron pentacarbonyl are held under reflux for 15 hours with stirring and nitrogen gassing (i.e., under a nitrogen atmosphere) in 350 ml. of peroxide-free, dry dibutyl ether. The mixture is thereafter cooled to room temperature. The precipitated inorganic material is separated off by filtration. The filtrate is placed in a distillation flask and first freed from dibutyl ether and excess iron pentacarbonyl under water-jet vacuum. The myrcene- (iron tricarbonyl) complex II is then distilled at 79–80°/0.25 mm. Hg and is obtained as a yellowish oil in a yield of 85%. The infrared spectrum displays, inter alia, strong absorptions at ca. 2020 and 1950 $cm.^{-1}$.

A solution of 12 g. of the myrcene-(iron tricarbonyl) complex obtained in 50 ml. of methanol is treated with vigorous stirring and cooling at 0° to −10° with a solution of 30 ml. of conc. sulphuric acid in 120 ml. of methanol. The mixture is held at 0° for 1 hour and subsequently at room temperature for 24 hours. The dark colored reaction solution is poured into a large amount of ice-water and the oil which separates is extracted with pentane. The organic phase is washed with sodium bicarbonate, then neutral with water and dried over sodium sulphate. After evaporation of the solvent, there are produced 11 g. of crude (7-methoxy-7-methyl-3-methylene-octene-1)-(iron tricarbonyl) complex which is still contaminated with the myrcene-(iron tricarbonyl) complex used as the starting material. For the separation of the unreacted myrcene-(iron tricarbonyl) complex, the crude reaction product is chromatographed on 220 g. silica gel. The ether eluates yield 7.3 g. of (7-methoxy-7-methyl-3 - methylene-octene - 1) - (iron tricarbonyl)complex. $R_f=0.5$ on silica gel plates impregnated with $AgNO_3$. Methylene chloride: benzene 3:7 as eluent. IR:$OCH_3$ band at 1060 cm.$^{-1}$.

3.6 g. of the (7-methoxy-7-methyl-3-methyleneoctene-1)-(iron tricarbonyl) complex obtained are dissolved in 5 ml. of ethanol and, with intensive stirring, treated dropwise with in 30–45 minutes with a 1-molar aqueous cerium ammonium nitrate $[Ce(NO_3)_6(NH_4)_2]$ solution. The decomposition of the $Fe(CO)_3$ complex commences with strong gas-evolution and after a further hour's reaction time the reaction solution pales from blood red to lemon yellow. The reaction mixture is treated with still more water and the decomplexed compound is taken up in pentane, washed with sodium bicarbonate and water, and the dried organic phase distilled off through a Vigreux column. There are thus obtained 1.6 g. of 7-methoxy-7-methyl-3-methylene-octene-1 of B.P. 84°/3 mm.; $n_D^{20}=1.4555$; UV $\lambda_{max}=225$ m$\mu$, $\epsilon=16400$; IR: 1070 cm.$^{-1}$.

EXAMPLE 2

3.0 g. of myrcene-(iron tricarbonyl) complex (manufactured as described in Example 1) in 10 ml. of glacial acetic are allowed to stand at room temperature for 24 hours with 600 ml. of a 48% solution of $BF_3$-etherate. The dark-brown coloured reaction mixture is poured onto 300 ml. of ice-water and extracted with a large amount of pentane. The organic phase is thereupon washed with sodium bicarbonate and finally neutral with water. After evaporation of the solvent, there are obtained 4 g. of a mixture of starting complex and (7-acetoxy-7-methyl-3-methylene-octene-1)-(iron tricarbonyl) complex. On the 30-fold amount of silica gel, the starting complex may be eluted with pentane, while the complex of the reaction product may be washed out with a pentane-benzene mixture (1:2). B.P. 120°/0.001 mm.; thin layer on silica gel $R_f=0.43$ (benzene:methylene chloride 7:3 as eluent); IR: 1740 and 1250 cm.$^{-1}$.

2.9 g. of the (7-acetoxy-7-methyl-3-methylene-octene-1)-(iron tricarbonyl) complex obtained are dissolved in 4.3 ml. of ethanol and, with intensive stirring, treated dropwise within 45 minutes with 34 ml. of a 1-molar aqueous cerium ammonium nitrate solution. The decomposition of the complex commences with strong CO-evolution. After a further 30 minutes, the reaction solution is yellow. The reaction mixture is treated with 100 ml. of ice-water and the 7-acetoxy-7-methyl-3-methylene-octene-1 obtained is taken up in pentane. The organic phase is washed with sodium bicarbonate and water and the solvent distilled off through a Vigreux column. The yield of 7-acetoxy-7-methyl-3-methylene-octene-1 amounts to 1.2 g.; B.P. 90°/11 mm.; $n_D^{20}=1.4608$; IR: 1740 and 1250 cm.$^{-1}$.

EXAMPLE 3

2.5 g. of myrcene-(iron tricarbonyl) complex (manufactured as described in Example 1) in 11 ml. of dioxan are cooled to $-10°$, treated with 1.5 ml. of 87% sulphuric acid and allowed to stand at room temperature for 15 hours. The reaction solution thereby becomes dark and a small amount of insoluble substance separates out. The reation product is precipitated with a large amount of ice-water, taken up in pentane and washed with sodium bicarbonate and water. After evaporation of the solvent, besides a small amount of residue there are obtained 1.8 g. of a mixture of starting complex (myrcene-$Fe(CO)_3$ complex) and (7-hydroxy-7-methyl-3-methylene-octene-1)-(iron tricarbonyl) complex. On the 50-fold amount of Alox (activity III), the starting complex may be eluted with pentane, while the complex of the reaction product may be first washed out with ether. Thin layer on silica gel $R_f=0.35$ (methylene chloride: benzene 3:7 as eluent); IR: 3600 cm.$^{-1}$.

5.65 g. of the (7-hydroxy-7-methyl-3-methylene-octene-1)-(iron tricarbonyl) complex obtained are cleaved in ethanolic solution with 1-molar cerium ammonium nitrate solution as described in the foregoing examples. Crude yield of 7-hydroxy-7-methyl-3-methylene-octene-1: 2.7 g.; B.P. 60°/0.01 mm.; thin layer on silica gel $R_f=0.15$ benzene:methylene chloride 7:3 as eluent.

EXAMPLE 4

(a) Preparation of the organoborane: 28 ml. of freshly distilled boron trifluoride ethyl etherate in 50 ml. of dry diglyme (diethyleneglycol dimethyl ether) are placed in a 350 ml. sulphonating flask. 5.6 g. of sodium borohydride in 200 ml. of absolute diglyme are then allowed to drop in with stirring. The diborane which forms in this manner in a slightly exothermic reaction is led, with a light nitrogen stream as carrier gas, into a second sulphonating flask in which 27.6 g. of myrcene-(iron tricarbonyl) complex are dissolved in 100 ml. of absolute tetrahydrofuran. The formation of the organoborane likewise proceeds slightly exothermically. After completed introduction of the diborane, the mixture is further stirred at room temperature for an hour before the subsequent reactions with the organoborane are carried out.

(b) Oxidative decomposition of the organoborane: 50 ml. of a solution of 4 vol. parts of tetrahydrofuran and 1 vol. part of water are added dropwise with ice-cooling to the highly reactive solution of the organoborane obtained. A mixture of 25 ml. of 12 percent ethanolic caustic potash and 25 ml. of 30 percent $H_2O_2$ are then added dropwise with constant cooling, a brown precipitate being immediately formed. After the usual working up, besides 10% of unchanged starting material there are obtained 70% of the (6-hydroxy-7-methyl-3-methylene-octene-1)-(iron tricarbonyl) complex. In addition, ca. 10% of the corresponding ketone are formed. The separation of these components may be brought about by chromatography on silica gel.

A solution of 9.1 g. of the complex obtained in 10 ml. of ethanol is cooled to 0° and treated with a drop of concentrated sulphuric acid in a small amount of ethanol. (The addition of sulphuric acid is not absolutely necessary, but it accelerates the decomplexation.) 100 ml. of a 1-molar cerium ammonium nitrate solution are subsequently added dropwise and with good stirring with constant cooling in an ice-bath. The reaction is followed with a gas meter. After completed evolution of gas, the reaction mixture is poured onto ice-cold 2 N sodium hydroxide solution and the organic phase is subsequently extracted with ether. After washing neutral with saturated common salt solution and drying over anhydrous sodium sulphate, the solvent is evaporated on the rotary evaporator. 3.1 g. of 6-hydroxy-7-methyl-3-methylene-octene-1 (70% of the theory) are obtained; UV $\lambda_{max}=224$ m$\mu$, $\epsilon=14800$; IR: 3400, 1600, 1275, 900 cm.$^{-1}$; thin layer $R_f=0.16$ benzene/cyclohexane=1:1; $R_f=0.83$ benzene/methanol=4:1.

EXAMPLE 5

4.7 g. of acetyl chloride and 11.5 g. of tintetrachloride in 150 ml. of abs. carbon tetrachloride are cooled to $-5°$ in a sulphonating flask with stirrer, dropping funnel, thermometer and gas inlet tube. With vigorous stirring and passing-through of nitrogen, the solution of 11.04 g. of myrcene-$Fe(CO)_3$ complex (manufactured as described in Example 1) in 10 ml. of abs. carbon tetrachloride is added dropwise thereto at $-5°$ to 0°. After about ⅓ of the solution has been added dropwise, the reacting mixture colors dark brown. The remainder of the complex solution is thereupon introduced at $-10°$. The mixture is allowed to react at $-10°$ for a further 60 minutes, and the dark brown colored reaction solution is poured onto 500 ml. of ice-water and exhaustively extracted with carbon tetrachloride. Washed with sodium bicarbonate and water, the carbon tetrachloride solution yields, after evaporation of the solvent, 10.95 g. of mixture of the iron tricarbonyl complexes of 7-methyl-6-acetyl-3-methylene-octadiene-1,7 and 7-methyl-7-chloro-6-acetyl-3-methylene-octene-1. The crude reaction mixture may be separated by chromatography on silica gel. The unreacted starting complex is eluted with hexane, while the said chlorine derivative [(7 - methyl-7-chloro-6-acetyl-3-methylene-octene-1)-(iron tricarbonyl) complex] of M.P. 83–84° is first eluted with a hexane-benzene mixture with increasing benzene content, and the (7 - methyl - 6-acetyl-3-methylene-octadiene-1,7)-(iron tricarbonyl) complex of M.P. 71–72.5° can be subsequently isolated. Thin layer chromatogram on silica gel: (7-methyl-7-chloro-6-acetyl-3-methylene-octene-1)-(iron tricarbonyl) complex $R_f=0.50$; (7-methyl-6 - acetyl - 3-methylene-octadiene-1,7)-(iron tricarbonyl) complex $R_f=0.43$ (benzene/methylene chloride as eluent).

The (7-methyl-7-chloro-6-acetyl-3-methylene-octene-1)-(iron tricarbonyl) complex is boiled at reflux for 5 minutes in 5% methanolic KOH solution. The mixture of isomers (7 - methyl - 6-acetyl-3-methylene-octadiene-1,6)-(iron tricarbonyl) complex and (7-methyl-6-acetyl-3-methylene-octadiene-1,7)-(iron tricarbonyl) complex is obtained in quantitative yield. This isomer mixture can be separated by chromatography on the 30-fold amount of silica gel with hexane-benzene as the eluant. Thin layer chromatogram on silica gel: (7-methyl-6-acetyl-3-methylene-octadiene-1,7)-(iron tricarbonyl) complex $R_f=0.43$; M.P. 71–73°. (7-methyl-6-acetyl-3 - methylene - octadiene-1,6)-(iron tricarbonyl) complex $R_f=0.33$; B.P. 100°/0.01 mm.

1.55 g. of the (7-methyl-6-acetyl-3-methylene-octadiene-1,7)-(iron tricarbonyl) complex obtained are split in ethanolic solution with an aqueous 1-molar cerium ammonium nitrate solution at room temperature as described in the foregoing examples. Crude yield of 7-methyl-6-acetyl-3-methylene-octadiene-1,7 0.9 g.; B.P. 60°/0.05 mm.; thin layer chromatogram on silica gel $R_f=0.44$ (benzene: methylene chloride 7:3).

Proceeding in similar manner as set forth in the preceding paragraph, 1.2 g. of 7-methyl-6-acetyl-3-methylene-octadiene-1,6 was obtained from 2 g. of the 7-methyl-6-acetyl-3-methylene-octadiene-1,6 - (iron tricarbonyl complex); B.P. 55°/0.1 mm.; IR: bands at 1650 cm.$^{-1}$; UV: 225 m$\mu$ ($\epsilon$=19100), 250 m$\mu$ ($\epsilon$=4960).

EXAMPLE 6

A mixture of 1 g. of osmium tetroxide and 2 drops of pyridine in a small amount of carbon tetrachloride is added dropwise at room temperature to a solution of 1 g. of myrcene-(iron tricarbonyl) complex (manufactured as described in Example 1) in 10 ml. of carbon tetrachloride. After the addition of the first drops the well-stirred solution becomes dark brown as a consequence of the formation of the osmiate ester. After completed dropwise addition, the mixture is further stirred at room temperature for 4 hours. After this time, the osmiate ester obtained is decomposed by introduction of a weak stream of hydrogen sulphide. After the formation of the osmium sulphide precipitate has finished, the mixture is filtered off from inorganic material through a suction filter filled with Celite. In this manner, one proceeds to an almost colorless filtrate which, after removal of the solvent on a rotary evaporator, can be chromatographed on silica gel (elution with chloroform) for further purification. Yield: 76% of pure (6,7-dihydroxy-7-methyl-3-methylene-octene-1)-(iron tricarbonyl) complex. This complex can also be obtained as follows: 1.4 g. of KClO$_3$ dissolved in 75 ml. of water are added to a solution of 2.34 g. (8.5 mmol) of myrcene-Fe(CO)$_3$ complex in 150 ml. of peroxide-free tetrahydrofuran. To this mixture there are thereafter added 110 mg. of OsO$_4$, which immediately leads to a brown-black colour of the solution. After stirring for 64 hours at room temperature, the OsO$_4$ is decomposed with a weak H$_2$S-stream, the mixture is filtered off from the resulting sulphide precipitate and worked up in the usual manner. After chromatography on 50 g. of SiO$_2$, in addition to 4.3% of unchanged adduct, there are obtained 55% of the desired diol and 15% of the corresponding ketol.

A solution of 5.5 g. of the (6,7-dihydroxy-7-methyl-3-methylene-octene-1)-(iron tricarbonyl) complex obtained in 5 ml. of ethanol is cooled to 0° and acidified with a drop of sulphuric acid in a small amount of ethanol. 55 ml. of a 1-molar cerium ammonium nitrate solution are subsequently added dropwise and with good stirring with constant cooling with an ice-bath. After completed gas-evolution, the reaction mixture is poured onto ice-cold 2 N NaOH solution and extracted with ether. After washing neutral with saturated common salt solution and drying of the ethereal phase over sodium sulphate, the solvent is removed on a rotary evaporator. 6,7-dihydroxy-7-methyl-3-methylene-octene-1 (90% of the theory) is thus obtained; UV: 225 m$\mu$; IR: 3400, 1650, 1600, 1280, 900 cm.$^{-1}$; thin layer: $R_f=0.5$; benzene/methanol 1:1.

EXAMPLE 7

1.0 g. (0.011 mol) of trioxymethylene are suspended in 6.6 g. of glacial acetic, treated with 1.0 g. of conc. sulphuric acid and, in order to depolymerise the formaldehyde, briefly heated to 90° with stirring. The mixture, cooled to room temperature, is afterwards treated with a solution of 6.9 g. (0.025 mol) of myrcene-(iron tricarbonyl) complex (manufactured as described in Example 1) in 6.6 g. of glacial acetic and stirred at room temperature for 4 hours. The reaction mixture is taken up in ether and washed with 2 N NaOH at 0° and then with common salt solution. The ether phase is dried over sodium sulphate and freed from solvent on the rotary evaporator. The residue is chromatographed on silica gel, whereby in addition to 0.64 g. (10%) of unchanged myrcene-Fe(CO)$_3$ complex there can be isolated 2.9 g. (33%) of (6 - acetoxymethyl - 7 - methyl-3-methylene-octadiene-1,7)-(iron tricarbonyl) complex. In the IR spectrum there are, inter alia, bands for the isopropenyl group at 890 cm.$^{-1}$ and 1650 cm.$^{-1}$, whilst the acetyl group has bands at 1730 and 1365 cm.$^{-1}$.

A solution of 22.8 g. of the complex obtained in 10 ml. of ethanol is cooled to 0° and treated with a drop of sulphuric acid in a small amount of ethanol. 200 ml. of a 1-molar cerium ammonium nitrate solution are then added dropwise with stirring and with constant ice-cooling to this solution. After completed gas-evolution, the reaction mixture is poured onto ice-cold 2 N NaOH solution and the product extracted with ether. After washing neutral with saturated common salt solution and drying of the ethereal solution over sodium sulphate, the solvent is removed on the thin-layer evaporator. 9.5 g. of 6-acetoxymethyl-7-methyl-3-methyleneoctadiene-1,7 (70% of the theory) are thus obtained; UV $\lambda_{max}$ 225 m$\mu$, $\epsilon$=14000; IR: 1745, 1650, 1600, 1370, 1240, 850 cm.$^{-1}$; thin layer: $R_f=0.5$ benzene/methanol 100:1.

What is claimed is:

1. Myrcene-(iron tricarbonyl) complex having the formula:

$(CH_3)_2C=CH-CH_2-CH_2$
$\qquad -C(=CH_2)-CH=CH_2 \cdot Fe(CO)_3$

2. Complexes of the general formula:

$R-CH_2-CH_2-C(=CH_2)-CH=CH_2 \cdot Fe(CO)_3$ wherein R is a member selected from the group consisting of $-CHR_1-C(=CH_2)CH_3$
$-CR_1=C(CH_3)_2$
$-CH_2-C(OR_2)(CH_3)_2$
$-CHOH-CH(CH_3)_2$ and $-CHOH-C(OH)(CH_3)_2$ wherein $R_1$ signifies acetyl or acetoxymethyl and $R_2$ signifies hydrogen, lower alkyl or lower alkanoyl.

3. Complexes in accordance with claim 2, wherein R is —$CHR_1$—$C(=CH_2)$—$CH_3$.

4. Complexes in accordance with claim 2, wherein R is —$CR_1=C(CH_3)_2$.

5. A complex in accordance with claim 3, wherein $R_1$ is acetyl.

6. A complex in accordance with claim 3, wherein $R_1$ is acetoxymethyl.

7. A complex in accordance with claim 4, wherein $R_1$ is acetyl.

8. Complexes in accordance with claim 2, wherein R is —$CH_2$—$C(OR_2)(CH_3)_2$.

9. A complex in accordance with claim 8, wherein $R_2$ is hydrogen.

10. A complex in accordance with claim 8, wherein $R_2$ is methyl.

11. A complex in accordance with claim 8, wherein $R_2$ is acetyl.

12. A complex in accordance with claim 2, wherein R is —CHOH—$CH(CH_3)_2$.

13. A complex in accordance with claim 2, wherein R is —CHOH—$C(OH)(CH_3)_2$.

References Cited
UNITED STATES PATENTS

| | | | |
|---|---|---|---|
| 3,111,533 | 11/1963 | Ecke | 260—439 |
| 3,126,401 | 3/1964 | Ecke | 260—439 |
| 3,137,715 | 6/1964 | Heck | 260—439 |
| 3,149,135 | 9/1964 | Ecke | 260—439 |

TOBIAS E. LEVOW, Primary Examiner

A. P. DEMERS, Assistant Examiner

U.S. Cl. X.R.

260—478, 486, 593, 597, 614, 632, 635